No. 756,935. PATENTED APR. 12, 1904.
W. R. BURROWS.
PERFORATING GLASS BULBS.
APPLICATION FILED MAR. 19, 1902.
NO MODEL.
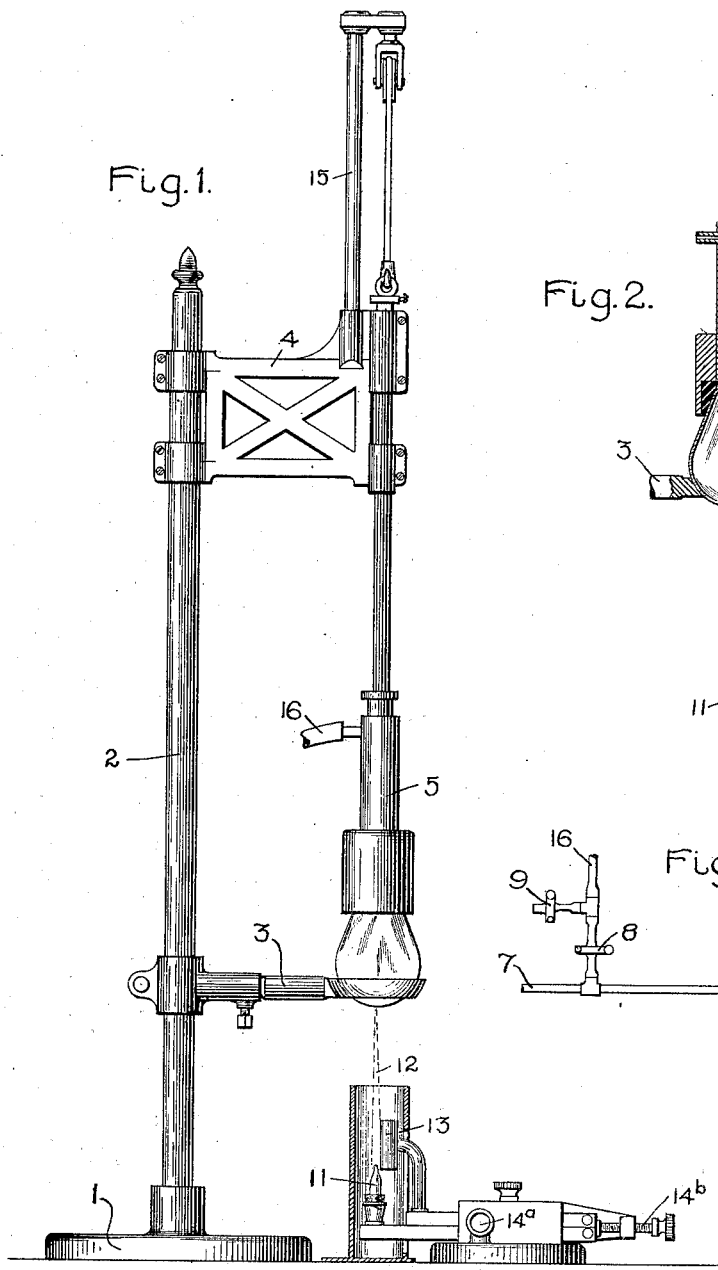
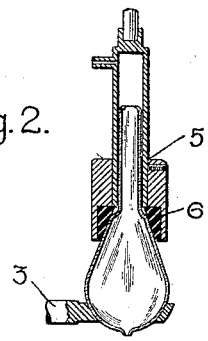
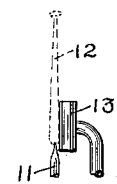
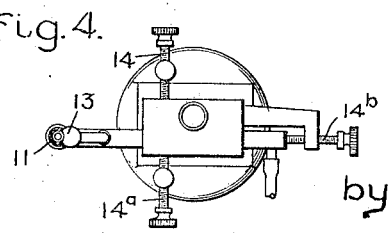
Witnesses.
Inventor.
William R. Burrows.
by Albert G. Davis
Atty No. 756,935. Patented April 12, 1904.

UNITED STATES PATENT OFFICE.

WILLIAM R. BURROWS, OF NEWARK, NEW JERSEY, ASSIGNOR TO GENERAL ELECTRIC COMPANY, A CORPORATION OF NEW YORK.

PERFORATING GLASS BULBS.

SPECIFICATION forming part of Letters Patent No. 756,935, dated April 12, 1904.

Application filed March 19, 1902. Serial No. 98,939. (No model.)

*To all whom it may concern:*

Be it known that I, WILLIAM R. BURROWS, a citizen of the United States, residing at Newark, county of Essex, State of New Jersey, have invented certain new and useful Improvements in Perforating Glass Bulbs, of which the following is a specification.

In the manufacture of incandescent electric lamps and other hollow glassware, among which may be mentioned various forms of vacuum-tubes, it is necessary to form a hole or opening to permit the connection of a branch tube by welding it to the edge walls of the opening. In the case of incandescent electric lamps the bulb comes from the glass-blower with a single open tubular extension at the stem end, at which the glass pillar which supports the filament is sealed fast. It becomes necessary to form an opening at some other part of the lamp in order to permit exhaustion of the air, and it is common to form a hole in the center of the dome to which a small glass tube is fused, this tube being connected with an air-pump when the vacuum is made. The hole is formed in various ways, commonly by applying a flame to the point at which it is to be made, and after the glass has been rendered sufficiently soft the operator blows into the bulb with a quick exhalation, thus swelling the glass around the hole to extreme thinness and bursting it, leaving a ragged edge of the desired size.

It is the object of the present invention to accomplish this result with greater uniformity than is possible by such a method. I accomplish a better result by mounting the bulb in a support and permitting a long slender blowpipe flame to play vertically at the point where the hole is desired, at the same time placing in communication with the open end of the bulb a mild air-pressure, which when the glass reaches the proper stage of softness blows a clean round hole eminently fitted for the connection of an extension-tube. The intensity of the flame is such that no ragged edges or fine glass are left as a residue after the operation, thus greatly improving the operation from the standpoint of health of the operator, as the fine fragments of glass are easily broken and form a dust which is very objectionable in the operating-room. This operation is distinctive in character from that of the air-pressure applied by the mouth of the operator. The latter is a quick expulsive blast which stretches the glass to extreme thinness before an opening is formed in the bulb; but in my process the light air-pressure applied, about two to four ounces, permits the glass to be punctured by the heat of the flame after being stretched only to a very slight extent, the difference residing in the fact that the pressure is light and is applied continuously and that the flame is continuously playing until the hole is formed, when, of course, the air-blast diverts it from the glass. Means for attaching and removing a bell cover or cap through which the air-pressure is applied are provided, furnished with a packing at the mouth to effect a substantially air-tight connection.

The invention comprises novel means for effecting the result, consisting of a flame blowing upon the spot where the puncture is desired and a cap for effecting an air-tight connection with the glass to be punctured, said cap being connected with a source of air-pressure of definite degree of compression.

The novel features will be hereinafter more particularly described and will be definitely indicated in the appended claims.

In the accompanying drawings, which illustrate the invention, Figure 1 is a side elevation of an apparatus for carrying out my improvements. Fig. 2 is a view illustrating a certain stage of the operation of puncturing an incandescent-lamp bulb. Fig. 3 is a detail showing the air-tight connections with a source of compressed air, and Fig. 4 is a detail view showing means for adjusting the position of the flame.

On a suitable base 1 is mounted a post or standard 2, on which is an adjustable bracket 3 to support the glass article to be operated upon. This bracket is shown in the drawings as adapted for an incandescent-lamp bulb and is provided with a beveled ring in which the dome-shaped end of the bulb may be supported. Another bracket 4 is adjustably arranged on the base, in which is slidingly mounted a rod carrying at its lower end a cap 5, lined with some soft substance, such as rubber, at its mouth, as indicated at 6, of suitable shape, to make a good joint with the wall of the lamp-bulb, as will be understood easily from an inspection of Fig. 2. Connecting with the top of the cap is a flexible pipe 16, leading from a source of compressed air. In order to regulate nicely the force of the air, the arrangement shown in Fig. 3 is employed, in which 7 represents the air-pipe coming from the source of compressed air, the branch which feeds the cap 5 being governed by a pinch-cock 8 and the pressure nicely graduated by means of a leak-tube capable of adjustment by means of a pinch-cock 9. This arrangement permits a nice adjustment of the pressure to be applied from the pipe 16 to the inside of the bulb to be perforated.

10 represents a pinch-cock governing the pressure of the blower 11, supplying air to the slender blowpipe-flame 12, the gas for which is furnished through a burner 13, constructed in the usual manner. In order to permit a nice adjustment of the flame with relation to the bulb, the burner and blower are mounted on a stand, and the flame may be shifted to the exact point desired by means of adjusting-screws 14 14ª 14ᵇ. (See Fig. 4.)

In the upper part of the bracket 4 is a post 15, on which is mounted a sheave, over which is carried a cord, the end of which may be attached to a foot-lever, handle, or other device for raising and lowering the cap 5.

In conducting the operation the cap is raised and a glass bulb set in position, as indicated in Fig. 1, and the cap lowered. Air-pressure is continuously on, and the flame is accurately adjusted, so that a fine-pointed tip plays at the center of the dome. The operation then becomes entirely automatic, the glass being softened, and when it reaches the proper condition the air-pressure within puncturing a hole of the required size and immediately blowing aside the flame, as indicated in Fig. 2, after which the bulb may be removed and another one put in position. No judgment on the part of the operator is required and no errors can be made. The holes are extremely uniform in character. The air-pressure may be graduated according to the thickness of the glass wall and the size of the opening. The pressure must be adjusted to suit conditions. It is important that it should be just right in order to make the right kind of a hole. Too high a pressure will make a very small hole, and too low a pressure would make a large hole. I regulate it by allowing the escape of most of the air from the source of pressure and by changing the amount allowed to escape, thereby governing the amount to act on the bulb. The pinch-cocks permit adjustment and regulation of the pressure on the bulb at will, so that it will not be necessary to maintain a certain pressure at the source of supply. Indeed, the source of supply may be of a very high pressure relatively to the pressure on the bulb.

What I claim as new, and desire to secure by Letters Patent of the United States, is—

1. Means for puncturing glass vessels, comprising a burner for directing a flame axially of the vessel against the point to be punctured, a removable cap for applying air-pressure to rupture the glass at the point at which the flame is applied, and means for adjusting the pressure of the air.

2. Means for rupturing the wall of a glass bulb, comprising a support for the bulb, a gas-burner beneath the same directing a flame upwardly against a point of its wall, and a movable cap connected with a source of definite gas-pressure for forming an air-tight joint with the mouth of the bulb.

3. Means for puncturing a glass bulb, comprising a support, a gas-burner beneath the same for softening the glass wall at a definitely-circumscribed point, a movable cap communicating with a source of gaseous pressure, and means for lowering the cap over the neck of the bulb and withdrawing it therefrom.

4. Means for puncturing a glass vessel, comprising a support, a burner for directing a flame on the point where the puncture is to be made in a line substantially normal to the wall of the vessel about that point, a member adapted to register with an open part of the vessel, a source of fluid-pressure, and a continuously-open connection between said member and the source of fluid-pressure.

5. Means for puncturing a glass vessel, comprising a support for the vessel, a burner beneath the same for directing a flame on the point where the puncture is to be made, an air-pipe, and means for applying air-pressure thereby continuously to the bulb while the glass is softening.

6. Means for puncturing a glass vessel, comprising a support for the vessel, a burner beneath the same for directing the flame at a definitely-circumscribed point on the same, a source of gaseous pressure, and a cap connected thereto and adapted to be applied to an open part of the vessel to maintain a continuous pressure while the glass is softening.

7. Means for puncturing a glass vessel, comprising, in combination, a support for the vessel, a burner for directing a flame against a definite point thereon, a source of gaseous pressure communicating with the vessel, and an adjustable leak-valve for regulating the pressure.

8. Means for puncturing glass vessels comprising means for directing a flame at a definitely-circumscribed point on the vessel in a line substantially normal to the wall of the vessel about that point, and means for supplying gaseous pressure to the vessel continuously while the glass is softening.

In witness whereof I have hereunto set my hand this 17th day of March, 1902.

WILLIAM R. BURROWS.

Witnesses:
S. N. WHITEHEAD,
JOHN E. MITCHELL, Jr.